United States Patent
Nitta

(10) Patent No.: US 11,640,530 B2
(45) Date of Patent: May 2, 2023

(54) LEARNING DEVICE, LEARNING METHOD, COMPUTER PROGRAM PRODUCT, AND RECOGNITION DEVICE

(71) Applicant: KABUSHIKI KAISHA TOSHIBA, Minato-ku (JP)

(72) Inventor: Shuhei Nitta, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 367 days.

(21) Appl. No.: 16/798,853

(22) Filed: Feb. 24, 2020

(65) Prior Publication Data

US 2020/0334529 A1  Oct. 22, 2020

(30) Foreign Application Priority Data

Apr. 22, 2019  (JP) .............................. JP2019-081223

(51) Int. Cl.
*G06N 3/08*  (2023.01)
*G06N 3/04*  (2023.01)

(52) U.S. Cl.
CPC ............... *G06N 3/08* (2013.01); *G06N 3/04* (2013.01)

(58) Field of Classification Search
CPC .......... G06N 3/04; G06N 3/08; G06N 3/0454; G06N 3/084
USPC ................................................... 348/36, 586
See application file for complete search history.

(56) References Cited

U.S. PATENT DOCUMENTS

| | | |
|---|---|---|
| 2018/0268293 A1 | 9/2018 | Noda |
| 2020/0097772 A1* | 3/2020 | Nakanishi ............. G06V 10/30 |

FOREIGN PATENT DOCUMENTS

| | | | | |
|---|---|---|---|---|
| DE | 112016003350 | * | 4/2018 | ............. G06N 3/04 |
| JP | 2018-152000 A | | 9/2018 | |
| JP | 2020-135465 A | | 8/2020 | |
| WO | WO2014/105866 A1 | | 7/2014 | |

OTHER PUBLICATIONS

Golnaz Ghiasi, et al., "DropBlock: a regularization method for convolutional networks", arXiv:1810.12890v1, Oct. 30, 2018, 11 pages.

Terrance Devries, et al., "Improved Regularization of Convolutional Neural Networks with Cutout", arXiv:1708.04552, Nov. 29, 2017, 8 pages.

Zhun Zhong, et al., "Random Erasing Data Augmentation", arXiv:1708.04896, Nov. 16, 2017, 10 pages.

Bolei Zhou, et al., "Learning Deep Features for Discriminative Localization", IEEE Conference on Computer Vision and Pattern Recognition (CVPR), Dec. 14, 2015, 10 pages.

* cited by examiner

*Primary Examiner* — Yosef K Laekemariam
(74) *Attorney, Agent, or Firm* — Oblon, McClelland, Maier & Neustadt, L.L.P.

(57) ABSTRACT

A learning device includes one or more processors. The processors acquire input data and a target label indicating a correct answer of inference based on the input data. The processors add noise to at least one of the input data and intermediate layer data of the neural network and perform inference by the neural network with respect to the input data. The noise is based on contributions of a plurality of elements included in the input data with respect to an inference result when the input data is input to a neural network. The processors update parameters of the neural network so that the inference result by the neural network matches the target label.

12 Claims, 7 Drawing Sheets

LEARNING DEVICE, LEARNING METHOD, COMPUTER PROGRAM PRODUCT, AND RECOGNITION DEVICE

CROSS-REFERENCE TO RELATED APPLICATIONS

This application is based upon and claims the benefit of priority from Japanese Patent Application No. 2019-081223, filed on Apr. 22, 2019; the entire contents of which are incorporated herein by reference.

FIELD

Embodiments described herein relate generally to a learning device, a learning method, a computer program product, and a recognition device.

BACKGROUND

As a method to suppress overfitting of the neural network, there are proposed a method of optimizing while setting a part of the node value of the intermediate layer to zero at random, and a method of optimizing while masking a part of input data at random.

However, in the related art, in some cases, parameters for adjusting the noise adding method, such as the frequency of adding noise, the position (element) where noise is added in data, the size of the noise, and the schedule according to the learning progress, are difficult to set, and overfitting cannot be sufficiently suppressed.

DETAILED DESCRIPTION

According to one embodiment, a learning device includes one or more processors. The processors acquire input data and a target label indicating a correct answer of inference based on the input data. The processors add noise to at least one of the input data and intermediate layer data of the neural network and perform inference by the neural network with respect to the input data. The noise is based on contributions of a plurality of elements included in the input data with respect to an inference result when the input data is input to a neural network. The processors update parameters of the neural network so that the inference result by the neural network matches the target label.

Preferred embodiments of a learning device according to the present invention will be described below in detail with reference to the accompanying drawings.

Hereinafter, a learning device that learns a neural network that performs inference using an image as input data will be described as an example. More specifically, an image classification problem of 10 classes for classifying an input image (two-dimensional image) into any of numbers 0 to 9 will be described as an example. The inference process is not limited to this, and the invention can be applied to other inference processes (including a recognition process and a classification process). For example, the invention can also be applied to the classification process other than 10 classes such as one class classification process (such as abnormality detection). The invention can also be applied to inference using a three-dimensional image, inference of an inference target (such as a specific speaker) from speech data, and inference using text data.

First Embodiment

In a first embodiment, a parameter of a noise to be added is determined based on the contribution of inference (recognition) of a neural network. Thereby, the parameter of the noise to be added is adaptively determined with respect to the learning progress and the recognition rate, and thus overfitting can be suppressed more stably. Moreover, if the neural network learned in this way is used, a recognition rate can be improved.

Figure 1:
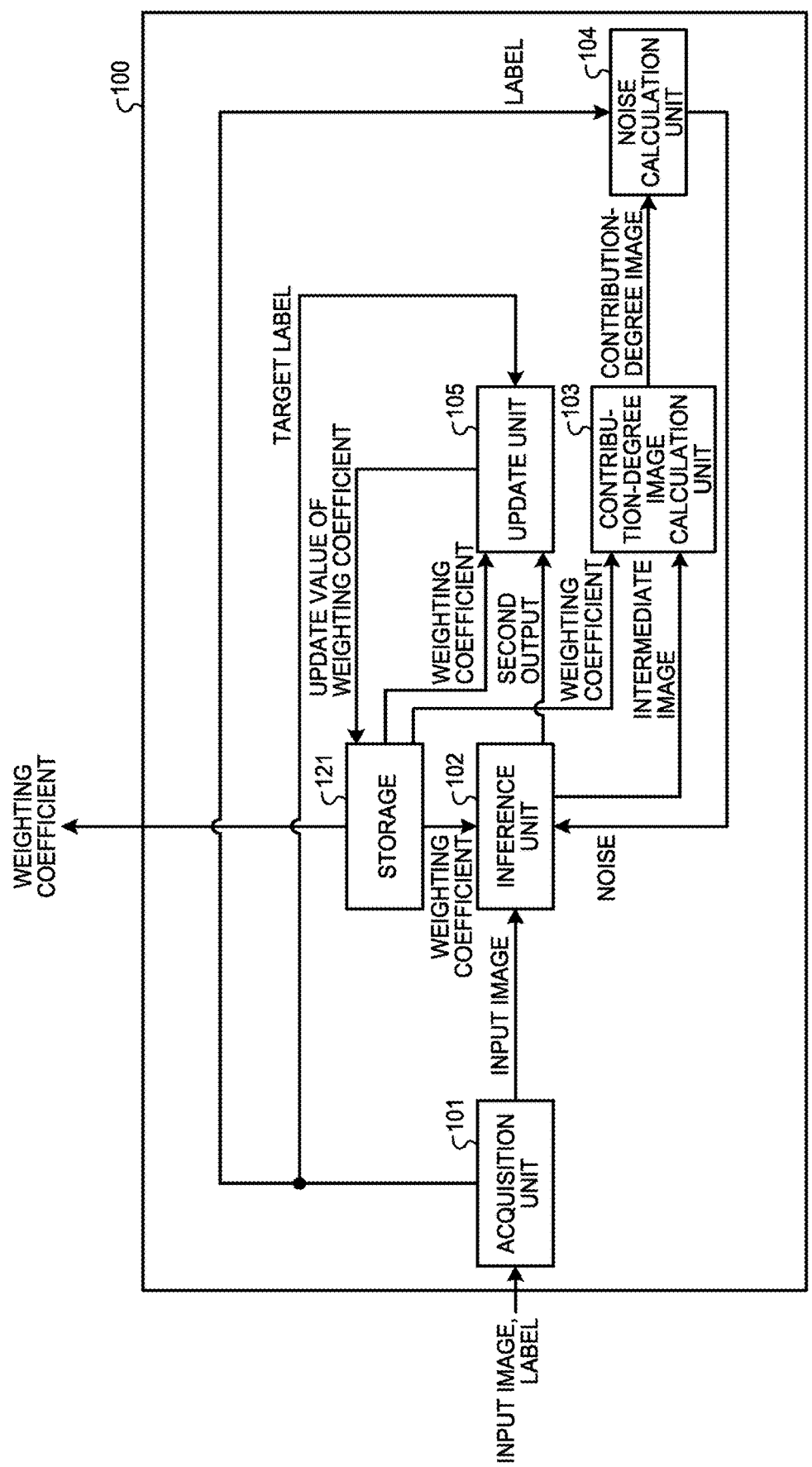
FIG. 1 is a block diagram of a learning device according to a first embodiment.

FIG. 1 is a block diagram illustrating a learning device 100 according to the first embodiment. The learning device 100 includes an acquisition unit 101, an inference unit 102, a contribution-degree image calculation unit 103, a noise calculation unit 104, an update unit 105, and storage 121.

The storage 121 stores various types of data used for various processes by the learning device 100. For example, the storage 121 stores parameters that determine a neural network to be learned and training data for learning. The parameters that define the neural network are, for example, a weighting coefficient and a bias.

The storage 121 can be configured by any storage medium generally used such as a flash memory, a memory card, a random access memory (RAM), a hard disk drive (HDD), and an optical disk.

The acquisition unit 101 acquires various types of information data used for various processes by the learning device 100. For example, the acquisition unit 101 acquires training data including an input image (an example of input data) and a target label indicating a correct answer of inference based on the input image. Any method may be used for the acquisition unit 101 to acquire the training data. For example, the acquisition unit 101 may acquire the data by reading the training data stored in the storage 121, or may acquire the data by receiving the training data from a server device or the like outside the learning device 100.

The inference unit 102 performs inference by a neural network for the input image. For example, the inference unit 102 inputs the input image to the neural network and acquires an inference result output from the neural network.

The contribution-degree image calculation unit 103 generates a contribution-degree image indicating a region that contributes to the inference of the input image when the input image is input to the neural network. The contribution-degree image can be interpreted as an image indicating the degree (contribution-degree) of attention (observation) at the time of inference for each region (a pixel or the like). The contribution-degree image is sometimes called a saliency map. Details of the generation method of the contribution-degree image will be described later.

The noise calculation unit 104 calculates noise to be added to at least one of the input image and the data (intermediate layer data) of the intermediate layer of the neural network. For example, the noise calculation unit 104 calculates noise from the target label and the contribution-degree image. Note that adding noise to the intermediate layer data is equivalent to adding noise to a weighting coefficient (a weighting coefficient multiplied by the intermediate layer data) corresponding to the intermediate layer data.

The inference unit 102 adds the noise calculated by the noise calculation unit 104 to at least one of the input image and the intermediate layer data (weighting coefficient), and further executes inference by the neural network for the input data.

The update unit 105 updates the parameter of the neural network. For example, the update unit 105 updates the weighting coefficient of the neural network by an error back propagation method so that the inference result by the neural network after adding noise to at least one of the input image and the intermediate layer data matches the target label. The parameter updating method is not limited to the error back propagation method, and any method may be used.

Each of the above units (the acquisition unit 101, the inference unit 102, the contribution-degree image calculation unit 103, the noise calculation unit 104, and the update unit 105) is realized by one or a plurality of processors, for example. For example, each of the above units may be realized by causing a processor such as a central processing unit (CPU) to execute a program, that is, by software. Each of the above units may be realized by a processor such as a dedicated integrated circuit (IC), that is, by hardware. Each of the above units may be realized by using software and hardware together. When a plurality of processors is used, each processor may realize one of the units, or may realize two or more of the units.

Figure 2:
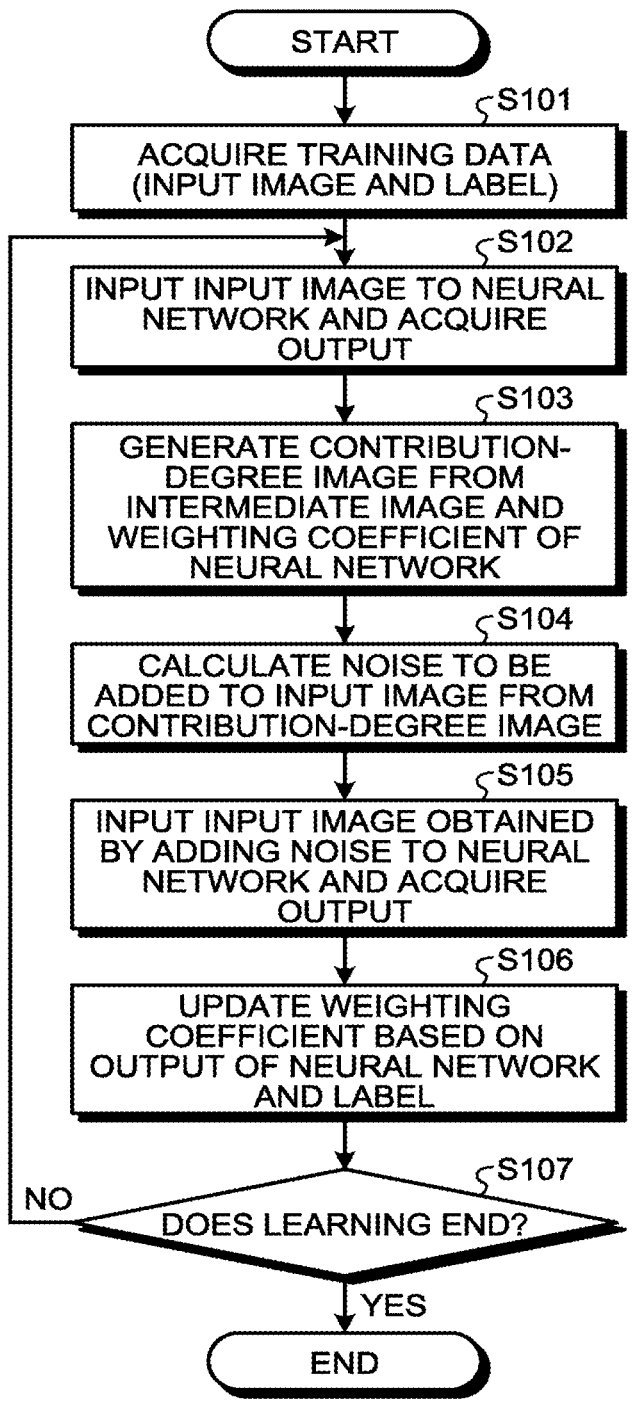
FIG. 2 is a flowchart of an update process in the first embodiment.

Next, the update process by the learning device 100 according to the first embodiment configured as described above will be described. FIG. 2 is a flowchart illustrating an example of the update process according to the first embodiment.

First, the acquisition unit 101 acquires an input image and a label that are training data (Step S101). In the following, the input image is represented as $x_i$ (i=1, 2, ..., N), and the label is represented as $t_i$. Note that i represents identification information (serial number or the like) for identifying training data, and N represents the number of training data.

Figure 3:
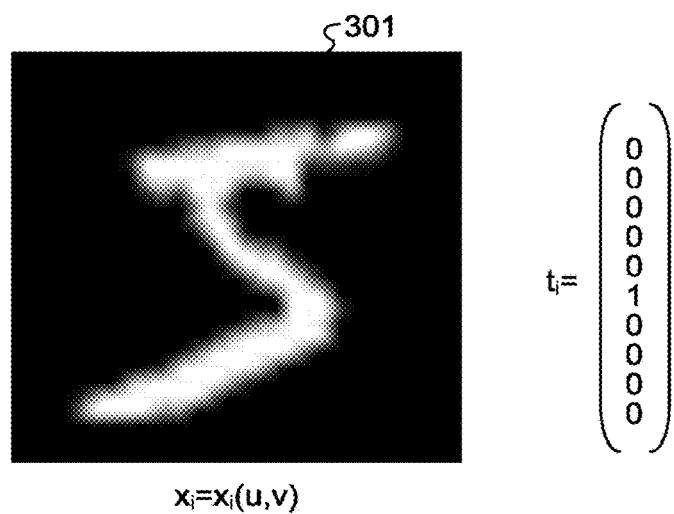
FIG. 3 is a view illustrating an example of an input image.

FIG. 3 is a diagram illustrating an example of the input image. An input image $x_i$ is, for example, a pixel set having a horizontal width W and a vertical width H, and is a W×H-dimensional vector. As illustrated in FIG. 3, the input image 301 is represented as $x_i$ (u,v). u represents the pixel position in the horizontal direction, and v represents the pixel position in the vertical direction.

The label $t_i$ is a 10-dimensional vector in which the element corresponding to the correct answer of the inference based on the input image $x_i$ is 1 and the other elements are 0. As illustrated in FIG. 3, for an input image $x_i$ of which the correct answer is "5", the label $t_i$ is expressed as $(0,0,0,0,0,1,0,0,0,0)^T$. Hereinafter, in the label $t_i$, an element indicating a correct answer may be referred to as a target label, and other elements may be referred to as non-target labels.

Returning to FIG. 2, the inference unit 102 inputs the input image $x_i$ to the neural network, and acquires an output $y_{1i}$ (first output) of the neural network corresponding to this input (Step S102). The output $y_{1i}$ is expressed by the following equation (1).

$$y_{1i} = f(w, x_i) \tag{1}$$

f is a function of the neural network that holds a weighting coefficient set w. For example, the function f repeats the process of a plurality of layers such as a convolution layer, a fully connected layer, a normalization layer, or a pooling layer, and outputs a 10-dimensional vector having the same number of dimensions as the label $t_i$. It is assumed that the output vector of the function f is a value after a softmax process, all elements are non-negative values, and the sum of elements is normalized to 1.

Next, the contribution-degree image calculation unit 103 generates a contribution-degree image based on the intermediate layer data (intermediate image), parameters (weighting coefficients), and the like (Step S103). The contribution-degree image $s_i$ is generated by, for example, the following equation (2).

$$s_i = g(w, x_i) \tag{2}$$

g is a function that outputs a contribution-degree image based on the weighting coefficient set w of the neural network and the input image $x_i$. As the contribution-degree image, for example, class activation mapping disclosed in "Learning Deep Features for Discriminative Localization", B. Zhou, A. Khosla, A. Lapedriza, A. Oliva, A. Torralba, In IEEE Conference on Computer Vision and Pattern Recognition (CVPR), pp. 2921-2929, 2016 (Non-patent Literature) can be used. When the class activation mapping is used, the intermediate image of the neural network at the time of inference of the input image $x_i$ can be generated by using the function of performing linear synthesization with the value of the weighting coefficient set w related to the target label as the function g. The intermediate image is an image corresponding to the output of the intermediate layer of the neural network.

Figure 4:
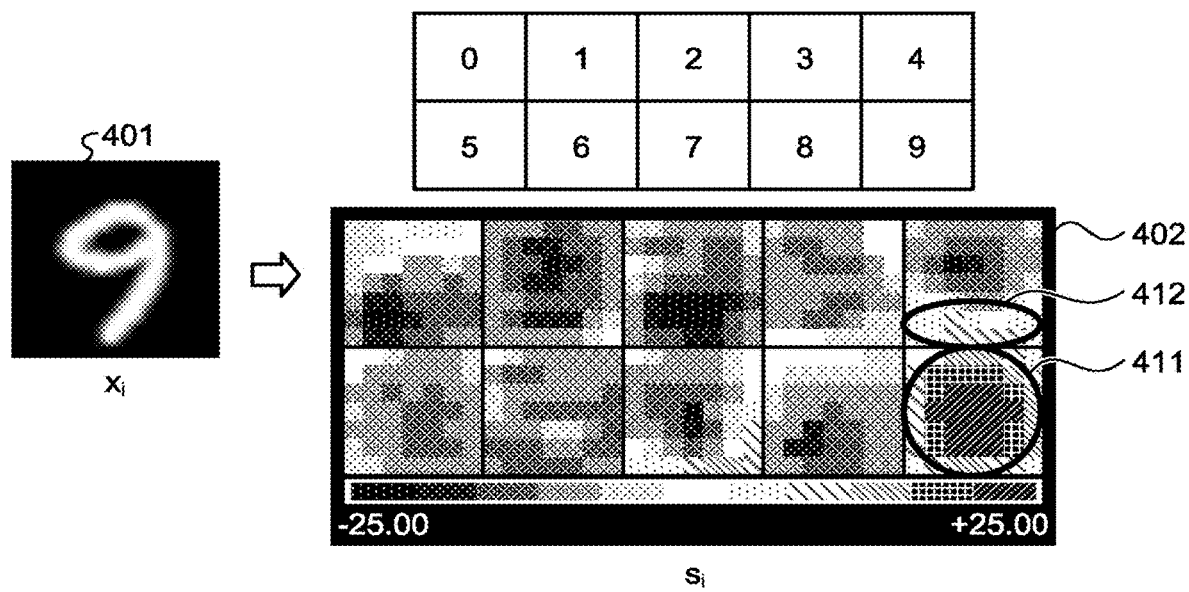
FIG. 4 is a view illustrating an example of a contribution-degree image.

FIG. 4 is a diagram illustrating an example of the contribution-degree image. FIG. 4 illustrates an example of the contribution-degree image 402 calculated based on the inference result for the input image 401 of which the correct answer is "9". The numerical value (0 to 9) at the top of the contribution-degree image 402 represents the inference result corresponding to each of the ten elements of the contribution-degree image 402. The contribution-degree image 402 is an image having pixel values corresponding to the contribution of inference. In FIG. 4, the difference in pixel value (contribution) is represented by the difference in the type of hatching, but for example, as in Non-patent Literature, the pixel value (contribution) may be represented by color.

In the example of FIG. 4, a pixel 411 of the contribution-degree image corresponding to "9" and a pixel 412 of a part of the contribution-degree image corresponding to "4" are pixels having a large contribution.

The contribution-degree image illustrated in FIG. 4 is an example, and any other contribution-degree image may be used. Many contribution-degree image calculation methods can calculate the contribution for each element of the output $y_{1i}$, as in the example of FIG. 4. Although the vertical and horizontal widths of the contribution-degree image differ depending on the calculation method, in this embodiment, the contribution-degree image is calculated with the same vertical and horizontal widths as the input image $x_i$. That is, in this embodiment, the contribution-degree image $s_i$ is a (W×H×C) dimensional vector. C corresponds to the number of classes to be classified. In this embodiment, C=10.

As described above, the contribution-degree image is an image indicating a region that contributes to the inference of the input image when the input image is input to the neural network. The region that contribute to inference includes, for example, a region that has a large influence on inference results due to changes in the value of the region and a region that is obtained by reversing the neural network path from the active part of the output.

Returning to FIG. 2, the noise calculation unit 104 calculates the noise to be added to the input image $x_i$ and the weighting coefficient set w (intermediate layer data) based on the label $t_i$ and the contribution-degree image $s_i$ (Step S104).

Hereinafter, a method of adding noise to the input image $x_i$ based on the contribution-degree image $s_i$ corresponding to the target label c will be described. The noise calculation unit 104 calculates the noise $n_i$ to be added by the following equation (3). T is a threshold value. $s_i$ (u,v,c) represents the pixel value of the contribution-degree image corresponding to the pixel position u in the horizontal direction, the pixel position v in the vertical direction, and the target label c.

$$n_i(u,v)=0 \text{(when } s_i(u,v,c) \geq T),$$

$$n_i(u,v)=1 \text{(when } s_i(u,v,c) < T) \quad (3)$$

As will be described later, the noise $n_i$ is added to the input image xi by multiplying the pixel value for each pixel (element) of the input image $x_i$. Therefore, the noise in the equation (3) can be interpreted as noise for performing optimization while zeroing pixels of which the contribution is equal to or greater than the threshold value T.

In the equation (3), among the pixels of the input image $x_i$, the pixel value of the pixel multiplied by the element having a value of "0" becomes zero, and the pixel value of the pixel multiplied by the element having a value of "1" is maintained to be an original value. Therefore, it can be interpreted that noise is added to the pixel (element) corresponding to the element having a value of "0".

Note that, as shown in the equation (3), the noise is obtained according to the comparison result between the contribution for each pixel and the threshold value. If information (contribution or the like) that can obtain noise is obtained, it is not necessary to generate a contribution-degree image in Step S103.

Next, the inference unit 102 inputs an image obtained by adding the noise $n_i$ to the input image $x_i$ to the neural network, and acquires an output $y_{2i}$ (second output) corresponding to the input (Step S105). The output $y_{2i}$ is expressed by the following equation (4). The symbol "⊙" represents a Hadamard product for calculating the product of each vector element.

$$y_{2i}=f(w,x_i \odot n_i) \quad (4)$$

Figure 5:
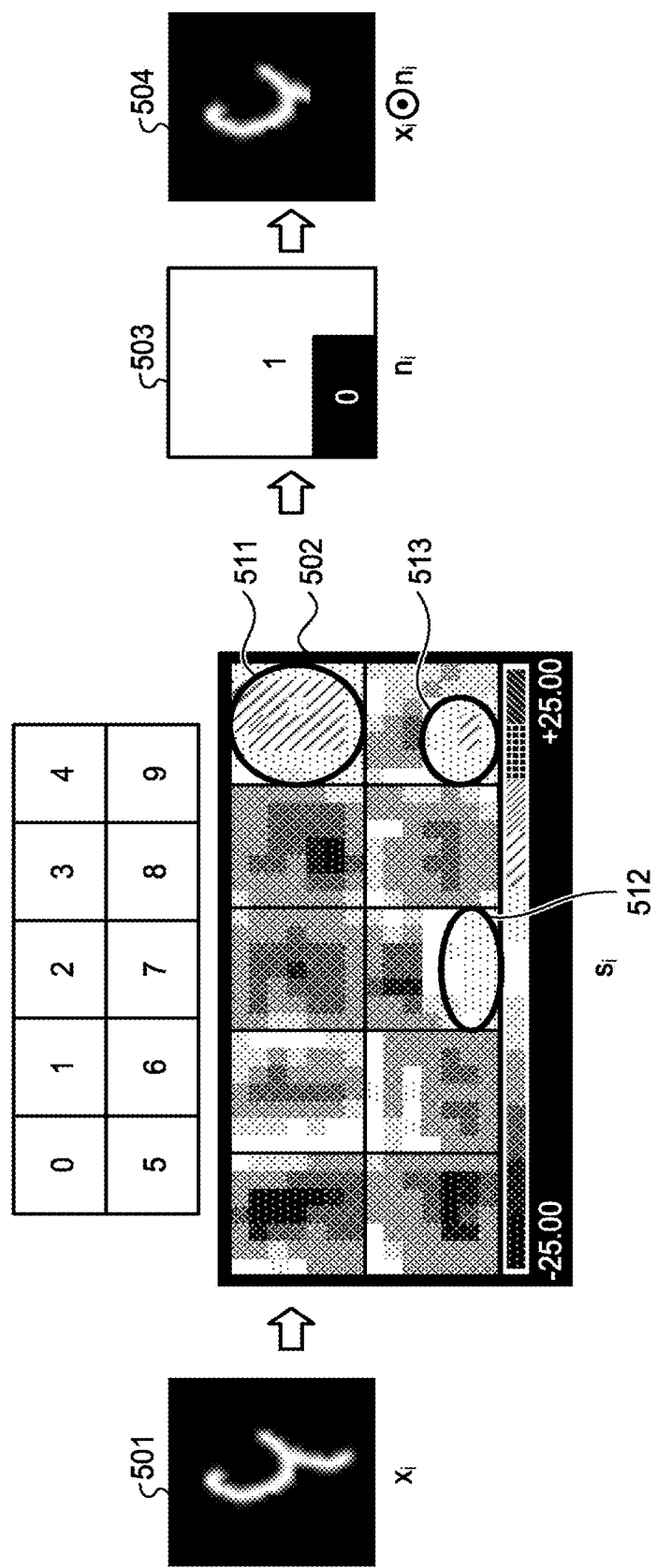
FIG. 5 is a view illustrating an example of noise and an image to which the noise is added.

FIG. 5 is a diagram illustrating an example of noise and an image ($x_i \lfloor n_i$) to which the noise is added. An input image 501 in FIG. 5 is an input image of which the correct answer is "9". The contribution-degree image 502 is an example of the contribution-degree image calculated based on the inference result for the input image 501. The input image 501 is an image in which the upper right part of the number "9" is cut off. Therefore, compared to the input image 401 of FIG. 4, the input image 501 is an image that is more likely to be erroneously inferred to be the number "4" or "7". That is, in the example of FIG. 5, a pixel 511 of the contribution-degree image corresponding to "4", a pixel 512 of a part of the contribution-degree image corresponding to "7", and a pixel 513 of a part of the contribution-degree image corresponding to "9" are pixels with a large contribution.

In this embodiment, as illustrated in FIG. 5, noise 503 is added to the input image 501 such that the pixel value of the pixel that currently contributes to the inference with respect to the contribution-degree image corresponding to the correct answer "9" is zero, and a new image 504 is obtained. As a result, the neural network advances learning so that inference is correctly performed from a new image including a region other than a region where the pixel value is changed to zero (a region where the contribution to the contribution-degree image is large). For this reason, features can be extracted from a wider range of the input image, and overfitting can be suppressed.

In addition, the pixel value of the contribution-degree image is small and close to random in the initial stage of learning, but the pixel value tends to increase in a local region as the learning progresses. For this reason, as the learning progresses, the position and size of a region where the contribution is large, that is, a region where the pixel value is zeroed are changed. This means that the frequency of adding noise, the position (element) to add noise, and the size of noise can be easily adjusted only by adjusting the threshold value T.

Returning to FIG. 2, the update unit 105 updates the value of the weighting coefficient set w based on the label $t_i$ and the output $y_{2i}$ (Step S106). For example, the update unit 105 calculates a loss L so that the higher the coincidence degree between the target label and the output $y_{2i}$, the smaller the loss L, and updates the weighting coefficient set w so as to minimize the loss L by a method such as an error back propagation method. For example, the update unit 105 calculates the loss L by the following equation (5).

$$L=-\Sigma i(t_i^T \ln(y_{2i})) \quad (5)$$

Next, the update unit 105 determines whether the learning has ended (Step S107). The update unit 105, for example, determines the end of the learning by the coincidence degree between the output $y_{1i}$ or the output $y_{2i}$ and the target label, the absolute value of the loss L, the reduction range of the loss L, and the number of updates of the weighting coefficient (the number of the learning processes from Step S102 to Step S106). When the learning is continued (Step S107: No), the procedure returns to Step S102 and the process is repeated. When it is determined that the learning has ended (Step S107: Yes), the update process ends.

As described above, in this embodiment, adjustment parameters such as the frequency, position, and size of noise added to the input image during learning of the neural network are adjusted based on the contribution-degree image. For this reason, adaptive regularization can be realized, and overfitting can be further suppressed.

First Modification

In the above embodiment, at each time of the learning process that is normally executed a plurality of times, the inference (first inference, Step S102) by the neural network for the input image and the inference (second inference, Steps S103 to S105) by the neural network for the input image to which noise is added are executed. That is, at each time of the repeated learning process, the inference is executed twice by the neural network.

The learning device 100 may be configured to perform the inference once for each learning process. For example, the learning device 100 calculates the noise added in the m-th learning process (m is an integer of 2 or more) in the learning processes based on the contribution with respect to the inference result of the inference by the neural network in the (m−1)-th learning process.

Figure 6:
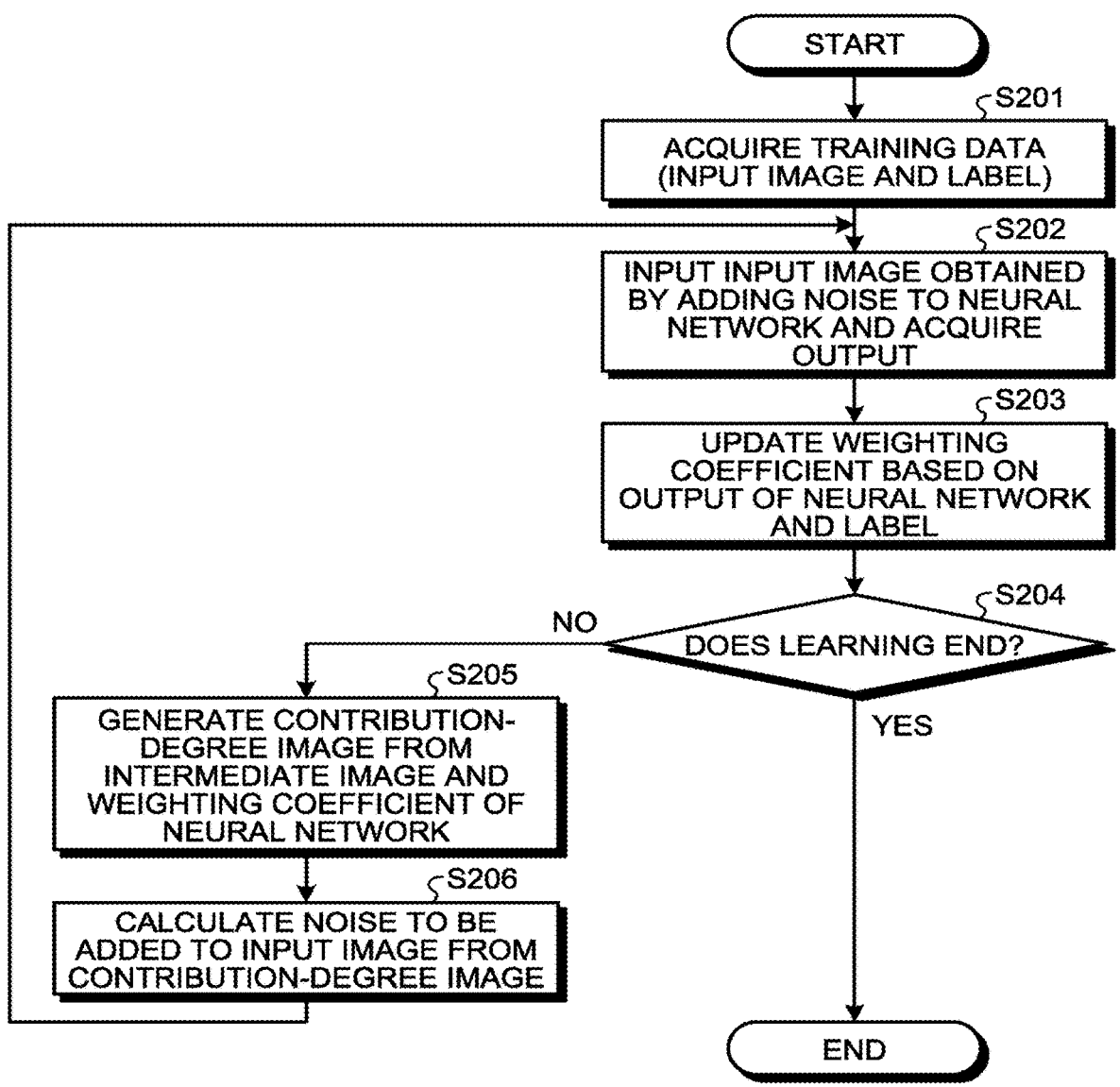
FIG. 6 is a flowchart of an update process in a modification.

FIG. 6 is a flowchart illustrating an example of the update process in this modification configured as described above. Step S201 is the same as Step S101 in FIG. 2, and thus the description thereof is omitted.

Next, the inference unit 102 inputs an image obtained by adding the noise $n_i$ to the input image $x_i$ to the neural network, and acquires an output $y_{2i}$ corresponding to the input (Step S202). In the first learning process, for example, an image to which noise is not added or an image to which noise is added so that the pixel value of a randomly selected pixel is zero is used.

Next, the update unit 105 updates the value of the weighting coefficient set w based on the label $t_i$ and the output $y_{2i}$ (Step S203). This process is the same as Step S106 in FIG. 2. Next, the update unit 105 determines whether or not the learning has ended (Step S204). This process is the same as Step S107 in FIG. 2.

Next, the contribution-degree image calculation unit 103 generates a contribution-degree image based on the intermediate layer data (intermediate image), parameters (weighting coefficients), and the like (Step S205). In this modification, the contribution-degree image calculation unit 103 generates the contribution-degree image from the intermediate layer data or the like at the time of inference of the input image to which noise is added.

Next, the noise calculation unit 104 calculates noise to be added to at least one of the input image $x_i$ and the weighting coefficient set w (intermediate layer data) in the next learning process based on the target label and the contribution-degree image $s_i$ (Step S206). This process is the same as Step S104 in FIG. 2.

After the noise is calculated in Step S206, the procedure returns to Step S202, and the next learning process is repeated. The inference unit 102 uses the noise calculated in Step S206 as the noise added to the input image at this time. That is, the inference unit 102 performs inference by adding the noise $n_i$ calculated in the (m−1)-th learning process to the input image $x_i$ in the m-th learning process.

With such a configuration, it is possible to reduce the number of inferences by the neural network and reduce the calculation load.

Second Modification

As described above, noise may be added to the intermediate layer data. In this modification, a method for adding noise to the intermediate layer data will be described.

When the noise is added to the convolutional layer data by using the neural network that includes the convolutional layer as described above, the inference unit 102 changes (normalize) the size of the contribution-degree image to match the image size of the intermediate layer. As the method for changing the image size, any conventionally used method such as a method for reducing or enlarging an image so that the numbers of vertical and horizontal pixels coincide with each other may be applied.

When the noise is calculated so that the noise corresponding to the contribution is added for each pixel (element) as in equation (3), the intermediate layer data is necessarily data capable of specifying the position of the element corresponding to the pixel position of the contribution-degree image. For example, when targeting a convolutional neural network (CNN) including multiple layers such as a convolutional layer, a fully connected layer, a normalization layer, and a pooling layer as described above, the convolutional layer, the pooling layer, and the like can be used as intermediate layer data capable of specifying a position. The applicable neural network is not limited to the CNN.

In the fully connected layer, the information on the position of the pixel (element) is lost (due to the total connection), and therefore, for example, the pixel (element) corresponding to the contribution cannot be determined. For this reason, when noise is added to the data of the fully connected layer, not the position (element) to add noise but the frequency of adding noise is controlled according to the contribution. For example, the noise calculation unit 104 determines the frequency of adding noise with a value calculated based on the contribution-degree.

For example, the noise calculation unit 104 calculates the average value, the mode value, and the maximum value of the pixel values of the contribution-degree image. In addition, the noise calculation unit 104 calculates noise to be added. For example, the noise calculation unit 104 calculates noise that makes some of the elements randomly zero.

The inference unit 102 adds noise to the data of the fully connected layer when the calculated value is equal to or greater than the threshold value T.

When calculating the average value, mode value, and maximum value of the pixel values, the noise calculation unit 104 does not use each pixel value of the contribution-degree image as it is, and may use the pixel value added with the weight according to a Gaussian distribution based on the center of the image, for example. For example, the noise calculation unit 104 may calculate a weighted average by multiplying each pixel value by a weight according to a Gaussian distribution that has a maximum value at the center of the contribution-degree image.

The noise calculation unit 104 may use only the pixel values of some pixels instead of using the pixel values of all the pixels of the contribution-degree image. For example, when the data indicating the position of a region to be noted (attention position data) is determined for each input image, the noise calculation unit 104 may calculate an average value or the like by using the pixel value of the pixel corresponding to the region indicated by the attention position data.

When noise is added to both the input image and the intermediate layer data, the above embodiment and this modification may be applied in combination.

Third Modification

The noise is not limited to the noise calculated as in the above equation (3). For example, the noise calculation unit 104 may calculate a random value for each element (pixel) or all elements at once instead of zero. The noise calculation unit 104 may calculate an average value of pixel values of surrounding pixels instead of zero.

The method of adding noise is not limited to the adding method using the Hadamard product with the input image as in the above equation (4). More generally, the inference unit 102 may add noise as shown in the following equation (6). $x_i'$ is, for example, an image having a fixed pixel value (solid image) or an image having an average value of pixel values of surrounding pixels as each pixel value.

$$n_i \lfloor x_i + (1-n_i) \lfloor x_i' \qquad (6)$$

When all the pixel values of $x_i'$ are 0, and $n_i$ is 0 or 1, equation (6) is equivalent to the Hadamard product $(x_i \lfloor n_i)$ of equation (4). When $x_i'$ is a solid image, equation (6) is an expression for adding noise so that the solid image is blended with the input image. When $x_i'$ is an image having an average value of pixel values of surrounding pixels as each pixel value, equation (6) is an equation for adding noise so as to blur the input image. Note that instead of two ways of 1 or 0, an intermediate value such as 0.5 can also be used as $n_i$. In this case, for example, $n_i$ may be $n_i=\text{Clip}(s_i(u,v,c)/T, \text{MIN}=0, \text{MAX}=1)$ instead of binarizing the pixel value of the contribution-degree image with the threshold value T.

Fourth Modification

The threshold value T may be a fixed value or a changed value. For example, the inference unit 102 may change the threshold value T so that the number of elements (pixels) to which noise is added is equal to or less than an upper limit value. The upper limit value may be determined, for example, as a value obtained by multiplying the number of pixels of the input image (or the number of elements of the intermediate layer data) by a predetermined ratio.

Fifth Modification

In the above embodiment, the noise is added based on the contribution-degree image $s_i$ corresponding to the target label c in the label $t_i$. Noise may be added based on the contribution-degree image $s_i$ corresponding to the non-target label c' other than the target label c in the label $t_i$. For example, the noise calculation unit 104 may calculate the noise $n_i$ to be added by the following equation (7). T' is a threshold value determined for the contribution-degree image $s_i$ of the non-target label. $s_i$ (u,v,c') represents the pixel value of the contribution-degree image corresponding to the pixel position u in the horizontal direction, the pixel position v in the vertical direction, and the non-target label c'.

$$n_i(u,v)=0 \text{(when Max}(s_i(u,v,c'))\geq T'),$$

$$n_i(u,v)=1 \text{(others)} \quad (7)$$

Equation (7) can be interpreted as an expression for adding noise so as not to consider an element that is erroneously focused.

The noise calculation unit 104 may calculate the noise $n_i$ to be added by the following equation (8).

$$n_i(u,v)=0 \text{(when } s_i(u,v,c')<T'),$$

$$n_i(u,v)=1 \text{(when } s_i(u,v,c')\geq T') \quad (8)$$

Equation (8) can be interpreted as an expression for adding noise for learning so that inference is correctly executed using an element that is erroneously focused.

The noise calculation unit 104 may add noise using both the contribution-degree image corresponding to the target label c and the contribution-degree image corresponding to the non-target label c'. For example, the noise calculation unit 104 may calculate the noise $n_i$ to be added by the following equation (9).

$$n_i(u,v)=0 \text{(when } s_i(u,v,c)\geq T \text{ and } s_i(u,v,c')\geq T'),$$

$$n_i(u,v)=1 \text{(others)} \quad (9)$$

Equation (9) can be interpreted as an expression that noise is added so as to focus on regions other than the region (common image feature) that is focused on both the target label and the non-target label.

For example, the numbers "1", "7", "9", and the like are similar in the pixel group corresponding to the lower portion (a line extending in the vertical direction), but the pixel groups in other portions are often not similar. In addition, in the example of learning a neural network for classifying trucks and passenger cars, the pixel groups corresponding to the front part of the vehicle (the portion including the headlight, windshield, driver's seat, or the like) are similar, but the other pixel groups are often not similar. If this modification is applied, it is possible to advance learning so that inference is correctly executed from information of dissimilar portions.

Second Embodiment

In a second embodiment, an information processing system including a recognition device that performs a recognition process using a neural network learned by a learning device will be described.

Figure 7:
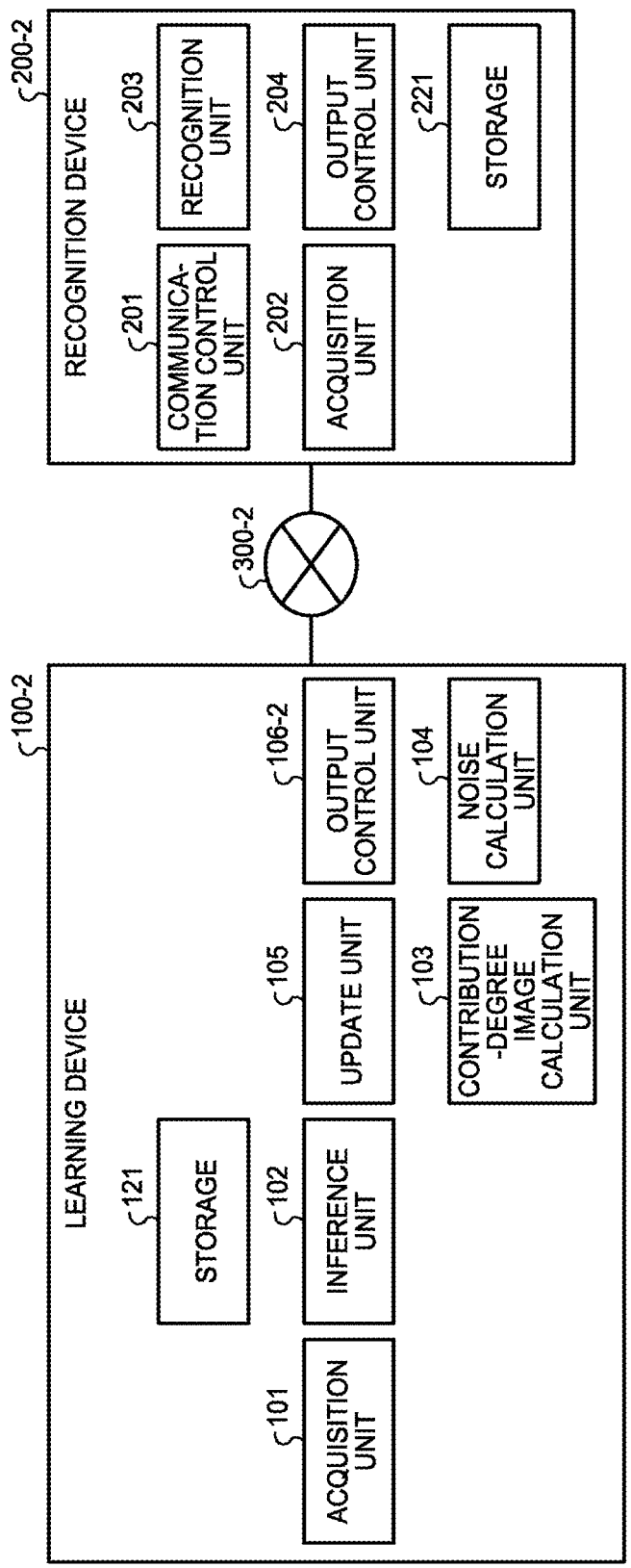
FIG. 7 is a block diagram of an information processing system according to a second embodiment.

FIG. 7 is a block diagram illustrating an example of a configuration of an information processing system according to the second embodiment. As illustrated in FIG. 7, the information processing system has a configuration in which a learning device 100-2 and a recognition device 200-2 are connected by a network 300-2.

The network 300-2 is the Internet or the like, but may be any other form of network. For example, the network 300-2 may be any one of a wired network or a wireless network.

The learning device 100-2 is different from the learning device 100 of the first embodiment in that an output control unit 106-2 is added. Since other configurations are the same as those of the learning device 100 of the first embodiment, the same reference numerals are given, and description thereof is omitted.

The output control unit 106-2 controls the output of various types of information from the learning device 100-2. For example, the output control unit 106-2 outputs the neural network parameters updated by the update unit 105 to the recognition device 200-2.

The recognition device 200-2 includes a communication control unit 201, an acquisition unit 202, a recognition unit 203, an output control unit 204, and storage 221.

The storage 221 stores various types of data used in various processes executed by the recognition device 200-2. For example, the storage 221 stores the parameters of the neural network transmitted from the learning device 100-2. The storage 221 can be configured by any commonly used storage medium such as a flash memory, a memory card, a RAM, an HDD, and an optical disk.

The communication control unit 201 controls communication with an external device such as the learning device 100-2. For example, the communication control unit 201 receives information on parameters that determine a learned neural network from the learning device 100-2.

The acquisition unit 202 acquires various types of data used for various processes by the recognition device 200-2. For example, the acquisition unit 202 acquires input data (such as an image) that is a target of the recognition process.

The recognition unit 203 recognizes an image by inputting the acquired image to a neural network.

The output control unit 204 controls the output of various types of information from the recognition device 200-2. For example, the output control unit 204 outputs the recognition result obtained by the recognition unit 203. The output method may be any method. For example, a method of displaying on a display device, a method of transmitting to an external server device, or the like can be used.

Note that the configuration of the information processing system illustrated in FIG. 7 is an example, and the invention is not limited thereto. For example, each unit of the recognition device 200-2 and each unit of the learning device 100-2 may be provided in one device (recognition device). In this case, functions (for example, the acquisition unit 101 and the acquisition unit 202, and the storage 121 and the storage 221) that can be shared may be shared. Further, the recognition device 200-2 may be physically configured by one device or may be physically configured by a plurality of devices. For example, the recognition device 200-2 may be constructed on a cloud environment.

The recognition process may be a process for recognizing any object using any data. For example, the recognition process may be a process of recognizing the voice of a specific speaker from the voice collected in the conference room. The recognition process may be a process of detecting (recognizing) an abnormality of the photographed object from an image photographed by the imaging device (camera). Such recognition process can be applied, for example, to a process for visual inspection of equipment in a factory by using an image to detect an abnormality, a process for detecting an abnormality (affected part) from a medical image, and the like.

As described above, according to the first and second embodiments, it is possible to further suppress overfitting of the neural network.

Figure 8:
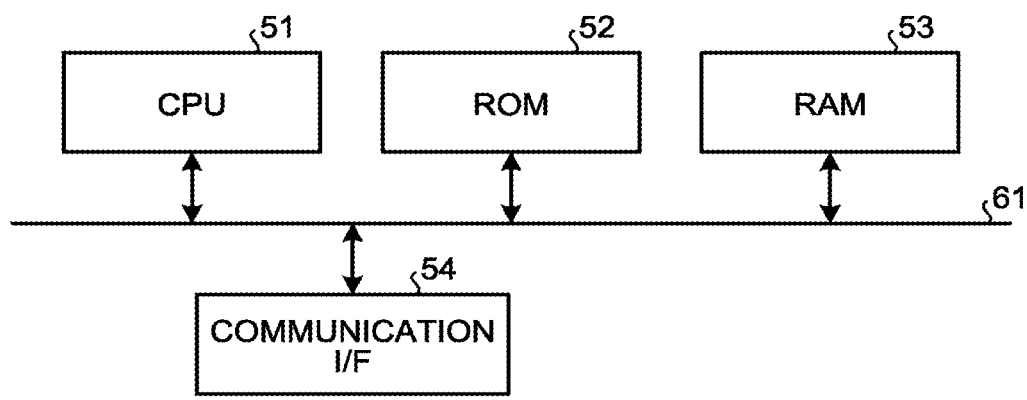
FIG. 8 is a hardware configuration diagram of a device according to the first or second embodiment.

Next, the hardware configuration of each device (learning device, recognition device) according to the first or second embodiment will be described with reference to FIG. 8. FIG. 8 is an explanatory diagram illustrating a hardware configuration example of the device according to the first or second embodiment.

The device according to the first or second embodiment includes a control device such as a central processing unit (CPU) 51, a storage device such as a read only memory (ROM) 52 and a random access memory (RAM) 53, a communication I/F 54 that is connected to a network to perform communication, and a bus 61 that connects the units.

The program executed by the device according to the first or second embodiment is provided by being preinstalled in the ROM 52 or the like.

The program executed by the device according to the first or second embodiment may be configured to be recorded as a file in an installable format or an executable format on a computer-readable recording medium such as a compact disk read only memory (CD-ROM), a flexible disk (FD), or a compact disk recordable (CD-R), a digital versatile disk (DVD) or the like and provided as a computer program product.

Furthermore, the program executed by the device according to the first or second embodiment may be configured to be stored on a computer connected to a network such as the Internet and provided by being downloaded via the network. The program executed by the device according to the first or second embodiment may be configured to be provided or distributed via a network such as the Internet.

The program executed by the device according to the first or second embodiment can cause a computer to function as each unit of the above-described device. In this computer, the CPU 51 can read and execute a program from a computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device comprising:
one or more processors configured to:
acquire input data and a target label indicating a correct answer of inference based on the input data;
add noise to target data that is at least one of the input data and intermediate layer data of a neural network and perform inference by the neural network with respect to the input data, the noise being based on contributions of a plurality of elements included in the input data with respect to an inference result when the input data is input to the neural network; and
update parameters of the neural network so that the inference result by the neural network matches the target label, wherein
the one or more processors add the noise to a first element among elements included in the target data, the first element having a contribution that is equal to or greater than a threshold value.

2. The learning device according to claim 1, wherein
the one or more processors add the noise to the first element having the contribution, with respect to the inference result that matches the target label, being equal to or greater than the threshold value.

3. The learning device according to claim 2, wherein
the one or more processors change the threshold value so that a number of elements to which the noise is added is equal to or less than an upper limit value.

4. The learning device according to claim 1, wherein
the one or more processors add the noise to the first element having the contribution, with respect to the inference result that does not match the target label, being equal to or greater than the threshold value.

5. The learning device according to claim 1, wherein
the one or more processors add the noise to the first element having the contribution, with respect to the inference result that does not match the target label, being equal to or less than the threshold value.

6. The learning device according to claim 1, wherein
the one or more processors add the noise to the first element having the contribution, with respect to the inference result that matches the target label, being equal to or greater than a first threshold value and having the contribution, with respect to the inference result that does not match the target label, being equal to or greater than a second threshold value.

7. The learning device according to claim 1, wherein
the one or more processors add the noise to at least one of the input data and the intermediate layer data at a frequency based on the contribution.

8. The learning device according to claim 1, wherein
the one or more processors execute a first inference by the neural network on the input data, calculate noise based on the contributions of the plurality of elements included in the input data with respect to an inference result of the first inference, add the calculated noise to at least one of the input data and the intermediate layer data, and execute a second inference on the input data by the neural network at each time of learning processes executed a plurality of times.

9. The learning device according to claim 1, wherein
the one or more processors
add the noise to at least one of the input data and the intermediate layer data at each time of learning processes executed a plurality of times and perform inference on the input data by the neural network, and
calculate the noise added in a m-th learning process (m is an integer of 2 or more) among the learning processes executed a plurality of times based on the contributions of the plurality of elements included in the input data with respect to the inference result of the inference by the neural network in a (m−1)-th learning process among the learning processes executed a plurality of times.

10. A learning method comprising:
acquiring input data and a target label indicating a correct answer of inference based on the input data;
adding noise to target data that is at least one of the input data and intermediate layer data of a neural network and performing inference by the neural network with respect to the input data, the noise being based on contributions of a plurality of elements included in the input data with respect to an inference result when the input data is input to the neural network; and
updating parameters of the neural network so that the inference result by the neural network matches the target label, wherein
the adding includes adding the noise to a first element among elements included in the target data, the first element having a contribution that is equal to or greater than a threshold value.

11. A computer program product having a non-transitory computer readable medium including programmed instructions, wherein the instructions, when executed by a computer, cause the computer to perform:
acquiring input data and a target label indicating a correct answer of inference based on the input data;
adding noise to target data that is at least one of the input data and intermediate layer data of a neural network and performing inference by the neural network with respect to the input data, the noise being based on contributions of a plurality of elements included in the input data with respect to an inference result when the input data is input to the neural network; and
updating parameters of the neural network so that the inference result by the neural network matches the target label, wherein
the adding includes adding the noise to a first element among elements included in the target data, the first element having a contribution that is equal to or greater than a threshold value.

12. An information processing system, comprising:
the learning device according to claim 1; and
a recognition device, wherein
the recognition device comprises:
one or more processors configured to:
  execute recognition of input data using the neural network learned by the learning device; and
  output a recognition result.

* * * * *